Aug. 7, 1923.
J. C. WIEHR
1,464,460
AUTOMOBILE SIGNAL
Filed March 8, 1921
2 Sheets-Sheet 2
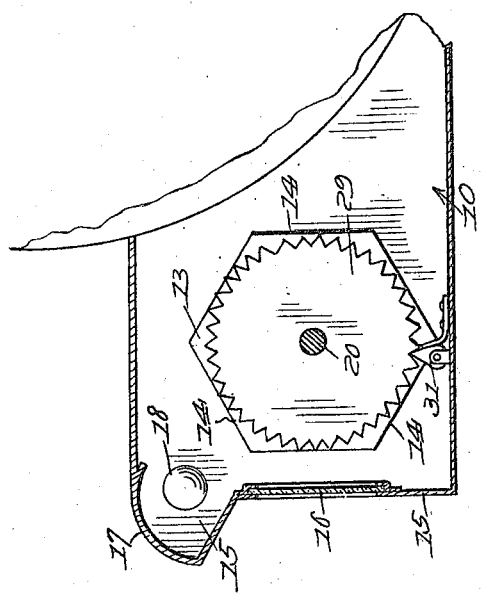
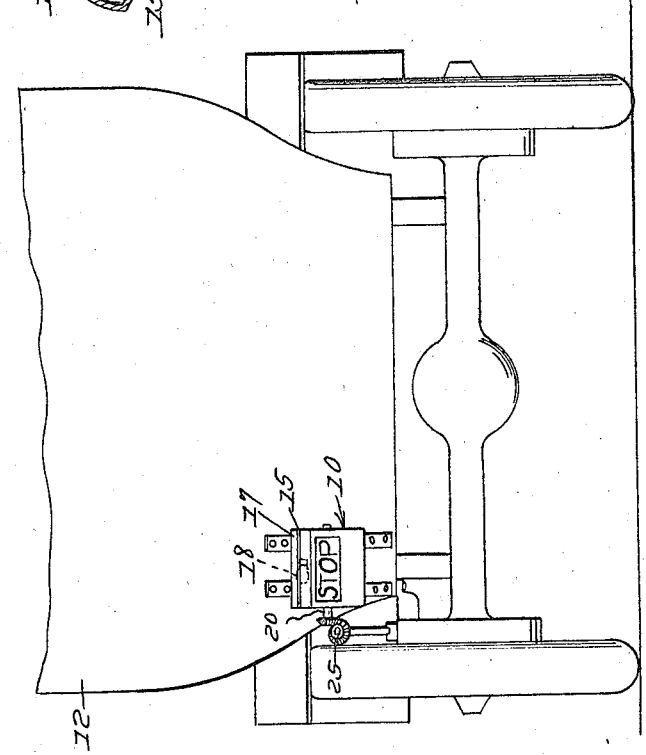

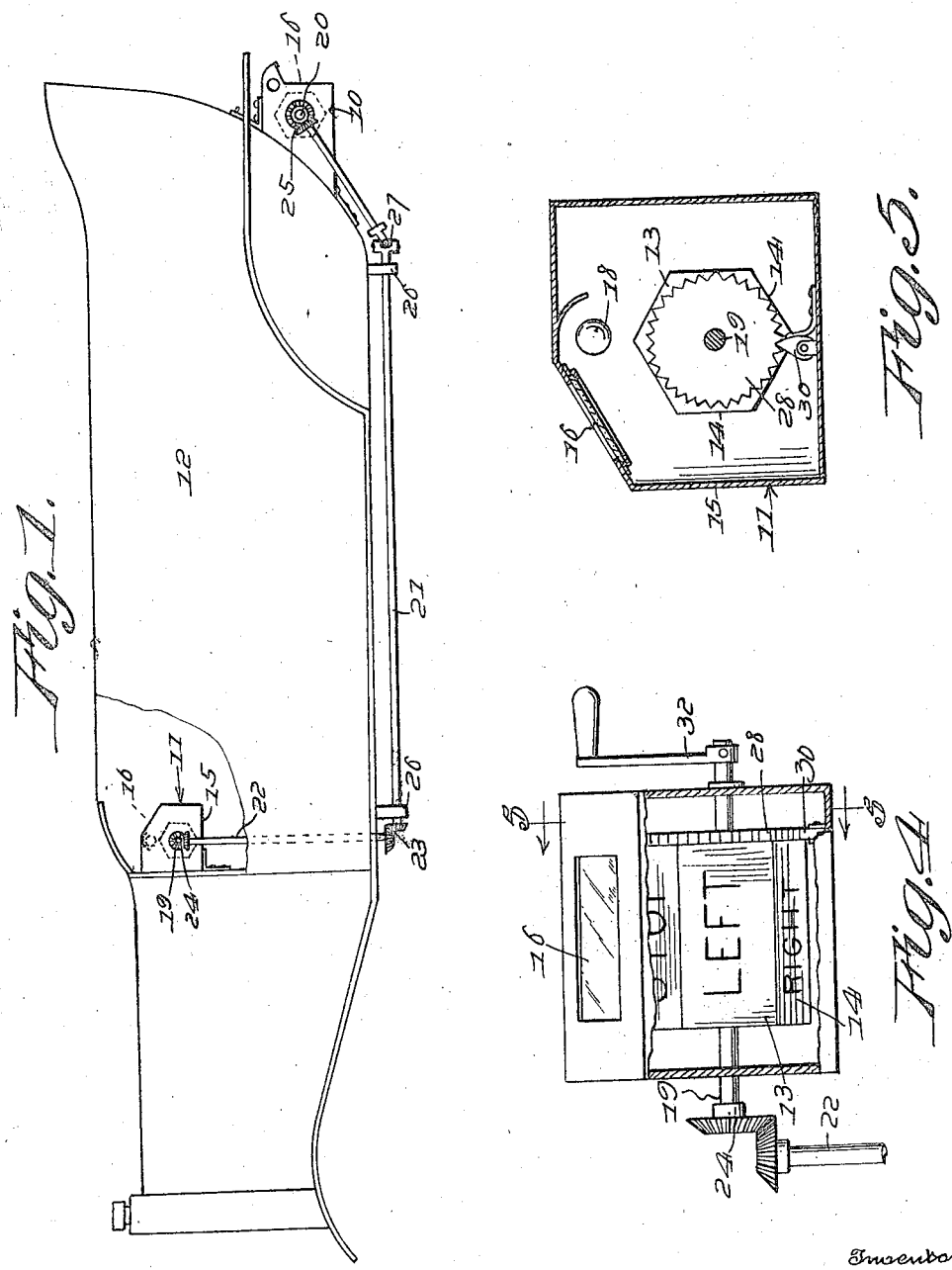

Patented Aug. 7, 1923.

1,464,460

UNITED STATES PATENT OFFICE.

JOHN C. WIEHR, OF MARINE CITY, MICHIGAN.

AUTOMOBILE SIGNAL.

Application filed March 8, 1921. Serial No. 450,690.

*To all whom it may concern:*

Be it known that I, JOHN C. WIEHR, a citizen of the United States of America, residing at Marine City, in the county of St. Clair and State of Michigan, have invented new and useful Improvements in Automobile Signals, of which the following is a specification.

The object of the invention is to provide a direction signalling apparatus for use in connection with automobiles and similar vehicles for display at the rear end of the vehicle within convenient view of the driver of a vehicle following that which is equipped with said apparatus, to the end that the driver of such following vehicle may be advised in advance of the intentions of the driver of the preceding vehicle with regard to stopping, starting, changing direction of progress toward the right or left, and the like, said apparatus including means for illuminating the directional signs or words so as to make them readily visible at night; and with this object in view the invention consists in a construction and combination of parts of which a preferred embodiment is shown in the drawing, wherein:—

Figure 1 is a side view of the apparatus applied in the operative position to a vehicle of the automobile type, the latter being shown diagrammatically or in outline to indicate the location of the members thereof.

Figure 2 is a rear view of the signal member of the apparatus in attached position.

Figure 3 is a longitudinal sectional view of the same.

Figure 4 is a transverse section of the indicating member.

Figure 5 is a section on the line 5—5 of Figure 4.

The apparatus consists essentially of a signal member 10 and an indicator member 11 respectively located at the rear end of the vehicle shown in outline at 12 and adjacent to and preferably in front of the driver's seat or station, to the end that when the driver desires to display a given signal at the rear of the vehicle, the indicator displays the corresponding signal to serve as a means of indicating to the operator that the desired signal is being displayed to the driver of a following vehicle, and each of said members embodies a rotary drum 13 of polygonal form having a plurality of display faces 14 respectively bearing signs or indications denoting for example "Proceed" or "Go ahead," "Slow down" or "Retard," "Stop," "Right," "Left," "Back" or "Reverse," or the equivalents thereof.

These drums are respectively arranged in casings 15 having transparent or light penetrable panels 16 facing rearwardly to permit of view from the rear of the display face of the drum which is exposed adjacent to and in parallel relation therewith, while extended over the casing, and preferably of an arched form, to act as a shield or water shed is a hood 17 beneath which, and in position to illuminate the exposed face of the drum is a lighting unit 18 which may consist as illustrated of an electric light globe or the equivalent thereof.

The spindles 19 and 20 of the indicator and signal drums are connected for simultaneous rotary movement by any suitable system of gearing such as the longitudinal shafts 21 and 22 connected by bevel pinions 23 and respectively receiving motion from and transmitting motion to the drum spindles by gears 24 and 25, the longitudinal shaft 21 being supported by suitable hanger bearings or brackets 26 located in any convenient positions upon the car, and said shaft 21 further being provided with a universal joint 27 to compensate for any relative vibratory movements of the parts and to enable motion to be communicated to the signal drum with the minimum number of gears or gear elements. The drums are preferably provided furthermore with ratchets 28 and 29 having teeth of cross-sectionally V-shape engaged by pawls or dogs 30 and 31 which while serving to lock the drums against accidental displacement when adjusted, permit of the movement thereof when the crank arm 32 or like operating means attached to the spindle of the indicator drum is manipulated by the driver of the car.

In operation the operator may readily and quickly turn the indicator drum in either direction to expose the desired signal designating his intention in regard to stopping, starting or turning, and simultaneously with the disclosure of the selected signal of the indicator drum, the corresponding notice is displayed on the signal drum within convenient view of the driver of a following car, to the end that rear-end collisions may be avoided, or the risk thereof may be minimized while at the same time the traffic movements may be expedited.

Having described the invention what is claimed as new and useful is:—

A direction signalling apparatus for automobiles and similar vehicles having indicating and signalling members for location respectively adjacent to the driver's station and at the rear end of the car and operatively connected for simultaneous adjustment to display corresponding signs or indications, and means for actuating the indicating member, each of said members consisting of a polygonal revoluble indicating drum, a casing enclosing the drum and provided with a light penetrable panel, an arched hood extending over the signalling casing and a lighting unit arranged beneath the hood in position to display the exposed surface of the signalling drum.

In testimony whereof he affixes his signature.

JOHN C. WIEHR.